(12) United States Patent
Tian et al.

(10) Patent No.: US 10,127,656 B2
(45) Date of Patent: Nov. 13, 2018

(54) METHOD AND APPARATUS FOR PROCESSING BLOCK TO BE PROCESSED OF URINE SEDIMENT IMAGE

(71) Applicant: Siemens Healthcare Diagnostics Inc., Tarrytown, NY (US)

(72) Inventors: Jiang Tian, Beijing (CN); Juan Xu, Beijing (CN); Zhi Yuan Zhang, Beijing (CN)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 105 days.

(21) Appl. No.: 15/306,870

(22) PCT Filed: Apr. 30, 2015

(86) PCT No.: PCT/US2015/028434
§ 371 (c)(1),
(2) Date: Oct. 26, 2016

(87) PCT Pub. No.: WO2015/168363
PCT Pub. Date: Nov. 5, 2015

(65) Prior Publication Data
US 2017/0046838 A1    Feb. 16, 2017

(30) Foreign Application Priority Data
Apr. 30, 2014  (CN) .......................... 2014 1 0183671

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/0014* (2013.01); *G06K 9/48* (2013.01);
(Continued)

(58) Field of Classification Search
CPC ...... G06K 9/0014; G06K 9/3233; G06K 9/34; G06K 9/00362; G06K 9/00369;
(Continued)

(56) References Cited

U.S. PATENT DOCUMENTS 5,627,908 A * 5/1997 Lee .................... G01N 15/1475
382/128
6,192,150 B1   2/2001 Leow et al.
(Continued)

FOREIGN PATENT DOCUMENTS

CN    101340551 A    1/2009
CN    102819836 A    12/2012

OTHER PUBLICATIONS

International Search Report and Written Opinion of International Application No. PCT/US2015/028434 dated Aug. 5, 2015.
(Continued)

*Primary Examiner* — Aklilu Woldemariam
(74) *Attorney, Agent, or Firm* — Kyle D. Petaja

(57) ABSTRACT

In the present invention are a method and apparatus for processing a block to be processed of a urine sediment image. The method comprises: dividing a block to be processed into a plurality of grids; calculating an n-dimensional local feature vector of each grid of the plurality of grids, where n is a positive integer; in the block to be processed, merging at least two adjacent grids of the plurality of grids into an intermediate block; calculating an intermediate block merging feature vector of the intermediate block; according to a predetermined combination rule, combining the intermediate block merging feature vectors obtained for different intermediate blocks of the block to be processed into a general combination feature vector of the block to be processed; and by way of taking the general combination feature vector as a feature in a feature set of block processing, processing the block to be processed.

16 Claims, 5 Drawing Sheets

(51) Int. Cl.
| | |
|---|---|
| *G06K 9/62* | (2006.01) |
| *G06T 7/11* | (2017.01) |
| *G06T 7/187* | (2017.01) |
| *G06T 7/194* | (2017.01) |
| *G06K 9/48* | (2006.01) |

(52) U.S. Cl.
CPC .......... *G06K 9/629* (2013.01); *G06T 7/0081* (2013.01); *G06T 7/11* (2017.01); *G06T 7/187* (2017.01); *G06T 7/194* (2017.01); *G06K 9/00* (2013.01); *G06T 2207/10056* (2013.01); *G06T 2207/20021* (2013.01); *G06T 2207/20144* (2013.01); *G06T 2207/30004* (2013.01)

(58) Field of Classification Search
CPC ........... G06K 9/00751; G06K 9/4614; G06K 9/4638; G06K 9/4647; G06K 9/4671; G06K 9/6292; G06K 9/48; G06K 9/6269; G06K 9/6282; G06K 9/629; G06K 9/42; G06K 9/469; G06K 9/6218; G06K 9/6231; G06K 9/6232; G06K 9/6247; G06K 9/6296; G06K 9/6298; G06K 2009/4666; G06K 9/52; G06T 2207/10056; G06T 2207/30024; G06T 7/11; G06T 7/0012; G06T 7/0081; G06T 2207/20021; G06T 2207/30004; G06T 7/187; G06T 7/194; G06T 2207/20144; G06T 2207/20141; G06T 2207/30104; G06T 7/00; G06T 7/136; G06T 2207/30068; G06T 2207/20112; G06T 7/174; G06T 7/40; C07C 47/575; C07C 37/62; C07C 45/00; C07C 45/673; C07C 45/71; C07C 47/565; C07C 39/27; A61K 31/437; A61K 31/496; A61K 31/5377; A61K 38/00; C07D 209/08; C07D 471/04; C12Q 2600/158; C12Q 1/6886; C12Q 2600/118; C12Q 2600/16; C12Q 2600/166; G01N 33/57434; G06F 19/20; G06F 19/24; G06F 19/3431
USPC ....... 382/132, 133, 159, 173, 164, 190, 181, 382/191
See application file for complete search history.

(56) References Cited

U.S. PATENT DOCUMENTS

| | | | | |
|---|---|---|---|---|
| 6,463,438 | B1* | 10/2002 | Veltri | G06K 9/0014 706/15 |
| 8,200,010 | B1 | 6/2012 | Jing et al. | |
| 9,858,469 | B2* | 1/2018 | Al-Kofahi | G06K 9/0014 |
| 2001/0031920 | A1* | 10/2001 | Kaufman | A61B 5/055 600/431 |
| 2002/0132235 | A1* | 9/2002 | Avihingsanon | C12Q 1/6883 435/6.1 |
| 2004/0122719 | A1* | 6/2004 | Sabol | G06F 19/324 705/7.13 |
| 2004/0122790 | A1* | 6/2004 | Walker | G06F 19/321 |
| 2005/0163373 | A1 | 7/2005 | Lee et al. | |
| 2005/0175243 | A1 | 8/2005 | Luo et al. | |
| 2007/0082356 | A1* | 4/2007 | Strom | C12Q 1/6883 435/6.18 |
| 2007/0211928 | A1* | 9/2007 | Weng | G01N 30/8624 382/128 |
| 2007/0237387 | A1 | 10/2007 | Avidan et al. | |
| 2007/0274584 | A1 | 11/2007 | Leow et al. | |
| 2009/0214096 | A1* | 8/2009 | Andrushkiw | G06T 7/0012 382/131 |
| 2009/0245611 | A1* | 10/2009 | Can | G01N 21/6458 382/133 |
| 2010/0099093 | A1* | 4/2010 | Weaver | C12Q 1/6886 435/6.11 |
| 2010/0111396 | A1* | 5/2010 | Boucheron | G06K 9/0014 382/133 |
| 2010/0128961 | A1 | 5/2010 | Kalusche | |
| 2010/0246926 | A1 | 9/2010 | Patel | |
| 2015/0218646 | A1* | 8/2015 | Haince | C12Q 1/6886 506/2 |
| 2015/0262035 | A1* | 9/2015 | Fink | G06K 9/6232 382/190 |
| 2016/0314335 | A1* | 10/2016 | Al-Kofahi | G06K 9/0014 |
| 2017/0132450 | A1* | 5/2017 | El-Zehiry | G01N 15/1463 |
| 2018/0144182 | A1* | 5/2018 | El-Zehiry | G01N 15/1463 |

OTHER PUBLICATIONS

Dalal et al.,"Histograms of Oriented Gradients for Human Detection", 2005, IEEE Computer Society Conference on Computer Vision and Pattern Recognition, CVPR 2005, pp. 1-9.

Boureau et al.,"Learning mid-level features for recognition", 2010, IEEE Computer Society Conference on Computer Vision and Pattern Recognition, CVPR 2010, pp. 1-11.

Boureau et al.,"Ask the locals: Multi-way local pooling for image recognition", 2011 International Conference on Computer Vision, ICCV 2011, pp. 1-11.

European Office Action of European Application No. 15785925.7 dated Feb. 9, 2018.

European Search Report and Written Opinion of European Application No. 15785925.7 dated Apr. 6, 2017.

Caicedo et al., "Content-Based Access to Medical Image Collections" Biomedical Image Analysis and Machine Learning Technologies: Applications and Techniques, Jan. 1, 2009 (Jan. 1, 2009), pp. 1-23. (As cited in the European Search Report for European Application No. 15785925.7).

\* cited by examiner

METHOD AND APPARATUS FOR PROCESSING BLOCK TO BE PROCESSED OF URINE SEDIMENT IMAGE

The subject application claims benefit under 35 USC § 119(e) of Chinese Patent Application No. 201410183671.6, filed Apr. 30, 2014. The entire contents of the above-referenced patent application are hereby expressly incorporated herein by reference.

TECHNICAL FIELD

The present invention relates to biological detection, and in particular to a method and apparatus for processing a block to be processed of a urine sediment image.

BACKGROUND ART

In common urine sediment analysis, first, a urine sample image is shot using a microscope imaging system. Then, the candidate blocks in the urine sample image are segmented using, for example, an edge detection technology. By removing obvious background blocks from these candidate blocks, blocks to be processed are detected. Next, the blocks to be processed are processed.

Currently, there are mainly two directions of processing the blocks to be processed. The first direction is classification, i.e. directly classifying these blocks to be processed into various visible element (such as a cast, an epithelium and an erythrocyte) blocks and background blocks that are easily confused with visible elements. The other direction is block retrieval, which does not directly classify the blocks to be processed but retrieves blocks similar to the previously stored blocks to be processed in a database. The unique difference with regard to the result of classification lies in that block retrieval may retrieve a plurality of similar blocks to be provided to a user, and thus can provide more information for the user. The user may perform a further selection or judgement in the plurality of similar blocks.

Currently, classification and block retrieval achieved by a machine automatically generally use an approach of machine learning. Several features for classification or block retrieval are specified and constitute a feature set. A large number of training sample blocks are firstly used to constitute a training sample set for training a processing model (a classification model or a block retrieval model). With regard to each training sample block in the training sample set, the features in the feature set are calculated for the processing model to learn. In this way, when the trained processing model receives a new block to be processed, the features in the feature set are calculated for the new block to be processed, and according to the calculated features in the feature set and with reference to the previous learning result, classification can be performed thereon or the previously stored similar images are retrieved therefor.

Contents of the Invention

One embodiment of the present invention aims to improve the precision of processing a block to be processed.

According to one embodiment of the present invention, a method for processing a block to be processed of a urine sediment image comprises: dividing a block to be processed into a plurality of grids according to a predetermined division rule; calculating an n-dimensional local feature vector of each grid of the plurality of grids, where n is a positive integer; in the block to be processed, according to a predetermined merging rule, merging at least two adjacent grids of the plurality of grids into an intermediate block; according to the n-dimensional local feature vectors of the grids contained in the intermediate block, calculating an intermediate block merging feature vector of the intermediate block; according to a predetermined combination rule, combining the intermediate block merging feature vectors obtained for different intermediate blocks of the block to be processed into a general combination feature vector of the block to be processed; and by way of taking the general combination feature vector as a feature in a feature set of block processing, processing the block to be processed.

In a particular implementation, processing a block to be processed of a urine sediment image comprises either of the following two: classifying the block to be processed; and performing block retrieval on the block to be processed.

In a particular implementation, the predetermined division rule is to divide the block to be processed for many times, the sizes of the grids after division in each division being the same, and the sizes of the grids after division in different divisions being different.

In a particular implementation, the step of calculating an n-dimensional local feature vector of each grid of the plurality of grids comprises: calculating a gradient value and a gradient direction of each pixel in the grid, wherein the gradient direction is approximated to one of n predetermined standard directions; and calculating a total gradient value of a pixel with a pixel gradient direction being approximated to a specific standard direction in the n standard directions in the grid as one dimension of an n-dimensional local feature vector of the grid, with a total gradient value of a respective pixel in the n standard directions corresponding to n dimensions of the n-dimensional local feature vector.

In a particular implementation, the step of calculating an intermediate block merging feature vector of the intermediate block comprises: taking a vector average value of the n-dimensional local feature vectors of various grids contained in the intermediate block as an intermediate block merging feature vector of the intermediate block.

In a particular implementation, the step of calculating an intermediate block merging feature vector of the intermediate block comprises: taking a maximum value of a specific dimension of the n-dimensional local feature vectors of various grids contained in the intermediate block as a corresponding dimension of an intermediate block merging feature vector of the intermediate block.

In a particular implementation, the step of calculating an intermediate block merging feature vector of the intermediate block comprises: cascading the n-dimensional local feature vectors of various grids contained in the intermediate block and performing normalization so as to obtain an intermediate block merging feature vector of the intermediate block.

In a particular implementation, the normalization is obtained by way of calculating a norm of the cascaded n-dimensional local feature vectors of various grids and dividing each dimension of the cascaded n-dimensional local feature vectors of various grids by the norm.

In a particular implementation, the predetermined combination rule is to cascade the intermediate block merging feature vectors obtained for different intermediate blocks of a block to be processed.

According to one embodiment of the present invention, an apparatus for processing a block to be processed of a urine sediment image is further provided, comprising: a division unit configured to divide a block to be processed into a plurality of grids according to a predetermined division rule;

a first calculation unit configured to calculate an n-dimensional local feature vector of each grid of the plurality of grids, where n is a positive integer; a merging unit configured to, in the block to be processed, according to a predetermined merging rule, merge at least two adjacent grids of the plurality of grids into an intermediate block; a second calculation unit configured to, according to the n-dimensional local feature vectors of the grids contained in the intermediate block, calculate an intermediate block merging feature vector of the intermediate block; a combination unit configured to, according to a predetermined combination rule, combine the intermediate block merging feature vectors obtained for different intermediate blocks of the block to be processed into a general combination feature vector of the block to be processed; and a processing unit configured to, by way of taking the general combination feature vector as a feature in a feature set of block processing, process the block to be processed.

In a particular implementation, the apparatus is used for either of the following two: classifying the block to be processed; and performing block retrieval on the block to be processed.

In a particular implementation, the predetermined division rule is to divide the block to be processed for many times, the sizes of the grids after division in each division being the same, and the sizes of the grids after division in different divisions being different.

In a particular implementation, the first calculation unit is configured to: calculate a gradient value and a gradient direction of each pixel in the grid, wherein the gradient direction is approximated to one of n predetermined standard directions; and calculate a total gradient value of a pixel with a pixel gradient direction being approximated to a specific standard direction in the n standard directions in the grid as one dimension of an n-dimensional local feature vector of the grid, with a total gradient value of a respective pixel in the n standard directions corresponding to n dimensions of the n-dimensional local feature vector.

In a particular implementation, the second calculation unit is configured to: take a vector average value of the n-dimensional local feature vectors of various grids contained in the intermediate block as an intermediate block merging feature vector of the intermediate block.

In a particular implementation, the second calculation unit is configured to: take a maximum value of a specific dimension of the n-dimensional local feature vectors of various grids contained in the intermediate block as a corresponding dimension of an intermediate block merging feature vector of the intermediate block.

In a particular implementation, the second calculation unit is configured to: cascade the n-dimensional local feature vectors of various grids contained in the intermediate block and performing normalization so as to obtain an intermediate block merging feature vector of the intermediate block.

In a particular implementation, the normalization is obtained by way of calculating a norm of the cascaded n-dimensional local feature vectors of various grids and dividing each dimension of the cascaded n-dimensional local feature vectors of various grids by the norm.

In a particular implementation, the predetermined combination rule is to cascade the intermediate block merging feature vectors obtained for different intermediate blocks of a block to be processed.

Since in the embodiments of the present invention, a block to be processed is not only divided into a plurality of grids, but also the grids are merged into an intermediate block, and an intermediate block merging feature vector of the intermediate block is calculated, this intermediate block merging feature vector further contains middle grade information reflecting a context relationship between the grids, which is different from the fact that the grids only reflect low grade local information, the precision of processing a block to be processed can be improved greatly.

In addition, since in the embodiments of the present invention, at least two adjacent grids are merged into an intermediate block and an intermediate block merging feature vector of the intermediate block is calculated, if the grids in the intermediate block shift mutually, etc., the obtained intermediate block merging feature vectors are still the same. In this way, the influence on the processing result due to a small change of an input block to be processed is reduced.

In addition, since in a particular implementation of the present invention, a block to be processed is divided for many times and the sizes of the grids after division in different divisions are different, intermediate blocks obtained in different divisions are also of different sizes and the contained context information is also different. Therefore, the influence that some context information (e.g. context information at the periphery of the boundary of an intermediate block) cannot be collected if division is only performed once is reduced.

DESCRIPTION OF THE ACCOMPANYING DRAWINGS

These and other features and advantages of the present invention will become more apparent by way of the detailed description hereinbelow in conjunction with the accompanying drawings.

Figure 2:
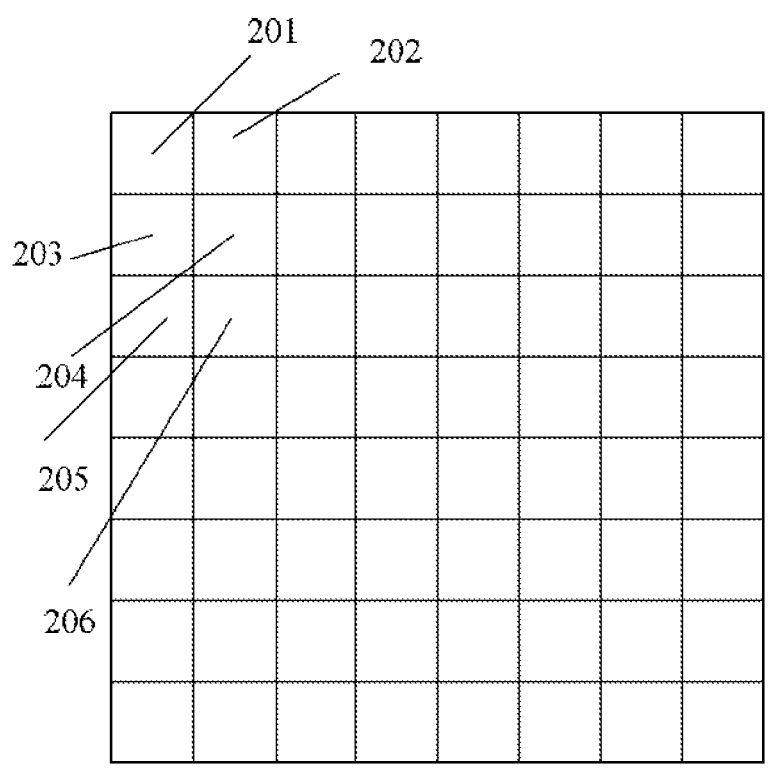
FIG. 2 shows grids after division from a block to be processed according to one embodiment of the present invention.

FIGS. 3*a-d* respectively show n-dimensional local feature vectors of grids 201-204 in FIG. 2 according to one embodiment of the present invention.

Figure 4A:
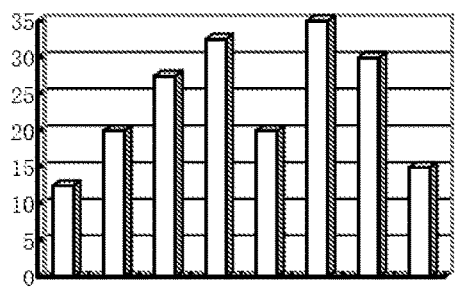

FIG. 4*a* shows an intermediate block merging feature vector of an intermediate block composed of grids 201-204 which is calculated through an average value method as claimed in one embodiment of the present invention.

Figure 4B:
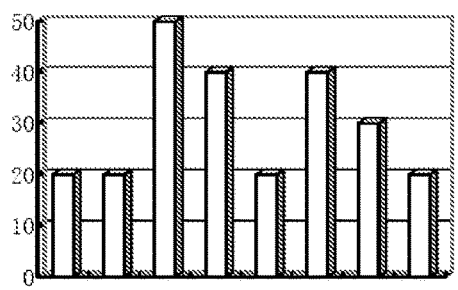

FIG. 4*b* shows an intermediate block merging feature vector of an intermediate block composed of grids 201-204 which is calculated through a maximum value method as claimed in one embodiment of the present invention.

Figure 4C:
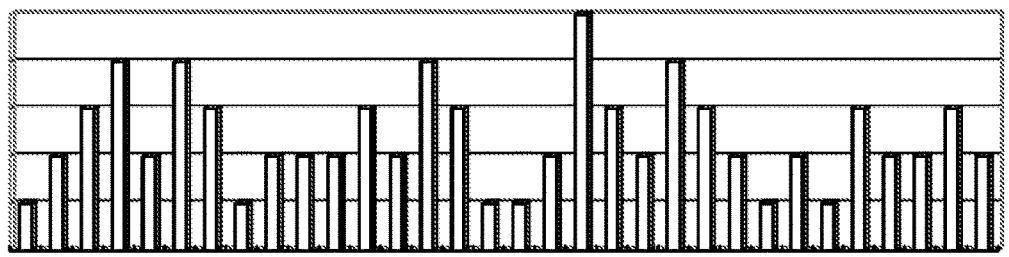

FIG. 4*c* shows an intermediate block merging feature vector of an intermediate block composed of grids 201-204 which is calculated through a cascading normalization method as claimed in one embodiment of the present invention.

Figure 5:
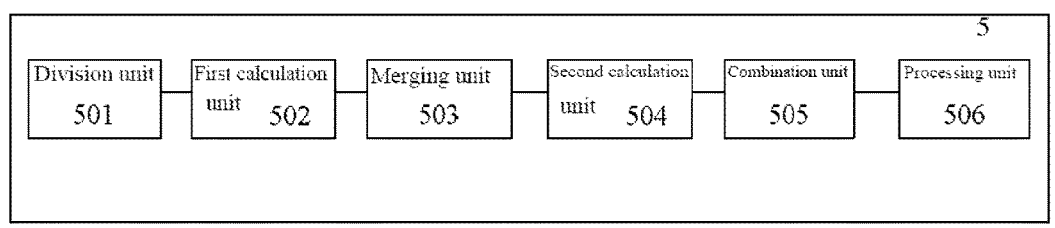

FIG. 5 shows a block diagram of an apparatus for processing a block to be processed of a urine sediment image according to one embodiment of the present invention.

Figure 6:
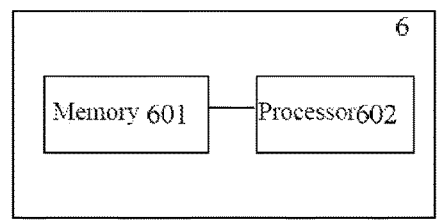

FIG. 6 shows a block diagram of a device for processing a block to be processed of a urine sediment image according to one embodiment of the present invention.

DETAILED DESCRIPTION OF EMBODIMENTS

Various embodiments of the present invention will be described below in detail in combination with the accompanying drawings.

Figure 1:
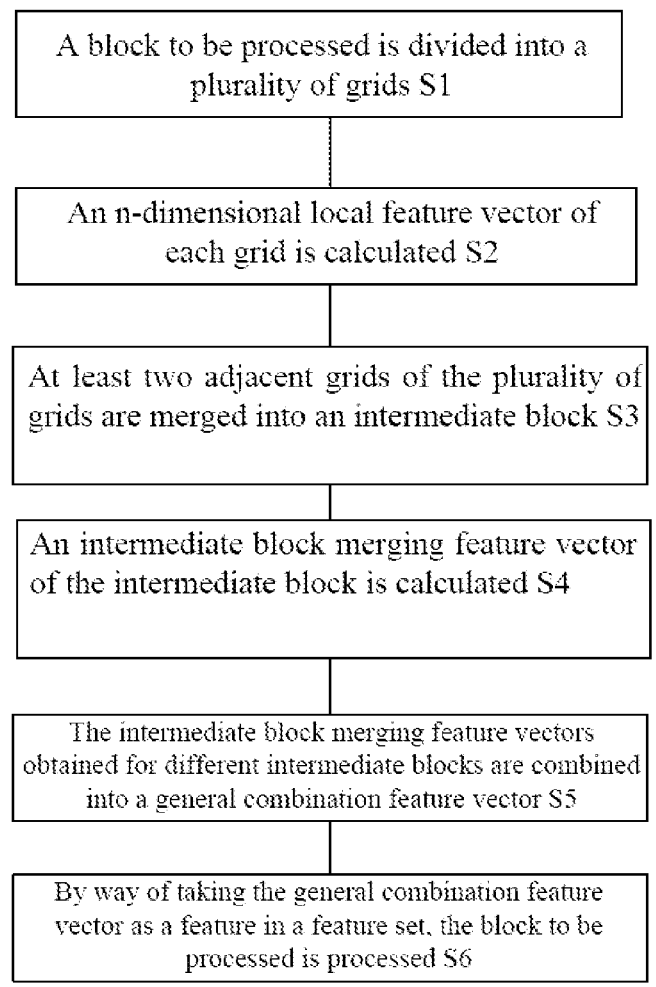
FIG. 1 shows a flowchart of a method for processing a block to be processed of a urine sediment image according to one embodiment of the present invention.

FIG. 1 shows a flowchart of a method 1 for processing a block to be processed of a urine sediment image according to one embodiment of the present invention.

In step S1, a block to be processed is divided into a plurality of grids according to a predetermined division rule. The predetermined division rule is to, for example, divide the block to be processed for many times, the sizes of the grids after division in each division being the same, and the sizes of the grids after division in different divisions being different. In general, the sizes of the blocks to be processed are basically consistent. Since the sizes of the grids after division in different divisions are different, different numbers of grids are obtained after division in different divisions.

For example, 16-equal-division is performed on the length and width of a block to be processed respectively, and 16×16 grids are obtained after division, and subsequent processing in steps S2-S6 is performed; 8-equal-division is performed on the length and width of a block to be processed respectively, and 8×8 grids are obtained after division, and subsequent processing in steps S2-S6 is performed; 8-equal-division is performed on the length of a block to be processed and 4-equal-division is performed on the width thereof, and 8×4 grids are obtained after division, and subsequent processing in steps S2-S6 is performed; 4-equal-division is performed on the length of a block to be processed and 8-equal-division is performed on the width thereof, and 4×8 grids are obtained after division, and subsequent processing in steps S2-S6 is performed; 4-equal-division is performed on the length of a block to be processed and 4-equal-division is performed on the width thereof, and 4×4 grids are obtained after division, and subsequent processing in steps S2-S6 is performed; 4-equal-division is performed on the length of a block to be processed and 2-equal-division is performed on the width thereof, and 4×2 grids are obtained after division, and subsequent processing in steps S2-S6 is performed; 2-equal-division is performed on the length of a block to be processed and 4-equal-division is performed on the width thereof, and 2×4 grids are obtained after division, and subsequent processing in steps S2-S6 is performed; and 2-equal-division is performed on the length of a block to be processed and 2-equal-division is performed on the width thereof, and 2×2 grids are obtained after division, and subsequent processing in steps S2-S6 is performed.

FIG. 2 shows a case where 8-equal-division is performed on the length and width of a 128×128-pixel block to be processed respectively, and 8×8 grids are obtained after division.

In step S2, an n-dimensional local feature vector of each grid of the plurality of grids is calculated, where n is a positive integer. For example, with regard to a grid 201 in FIG. 2, an n-dimensional local feature vector thereof is calculated as follows.

Firstly, a gradient value and a gradient direction of each pixel of 128×128 pixels in the grid 201 are calculated, wherein the gradient direction is approximated to one of eight predetermined standard directions. The eight standard directions are 0 degrees, 45 degrees, 90 degrees, 135 degrees, 180 degrees, 225 degrees, 270 degrees and 315 degrees. The gradient direction between −22.5 degrees and 22.5 degrees may be approximated to 0 degrees; the gradient direction between 22.5 degrees and 67.5 degrees is approximated to 45 degrees; the gradient direction between 67.5 degrees and 112.5 degrees is approximated to 90 degrees; the gradient direction between 122.5 degrees and 157.5 degrees is approximated to 135 degrees; the gradient direction between 157.5 degrees and 202.5 degrees is approximated to 180 degrees; the gradient direction between 202.5 degrees and 247.5 degrees is approximated to 225 degrees; the gradient direction between 247.5 degrees and 292.5 degrees is approximated to 270 degrees; and the gradient direction between 292.5 degrees and 337.5 degrees is approximated to 315 degrees.

Figure 3A:
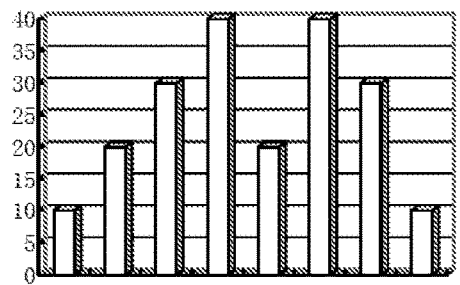

Then, pixels with a gradient approximation direction falling within each of 0 degrees, 45 degrees, 90 degrees, 135 degrees, 180 degrees, 225 degrees, 270 degrees and 315 degrees are respectively counted, and the gradient values of pixels with a gradient direction falling within each of 0 degrees, 45 degrees, 90 degrees, 135 degrees, 180 degrees, 225 degrees, 270 degrees and 315 degrees are respectively added so as to obtain an eight-dimensional local feature vector of the grid 201, as shown in FIG. 3a. Eight straight square columns in FIG. 3a respectively represent the total gradient values of pixels with a gradient direction being approximated to each of 0 degrees, 45 degrees, 90 degrees, 135 degrees, 180 degrees, 225 degrees, 270 degrees and 315 degrees of the grid 201. For example, the first straight square column represents the sum of the gradient values of all the pixels with a gradient direction being approximated to 0 degrees of the grid 201, and the second straight square column represents the sum of the gradient values of all the pixels with a gradient direction being approximated to 45 degrees of the grid 201.

Figure 3B:
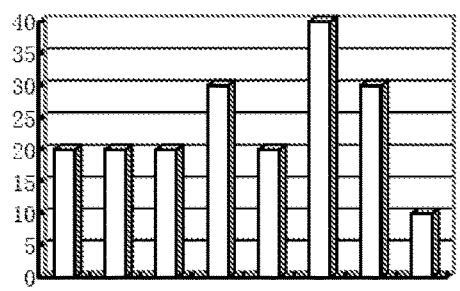
Figure 3C:
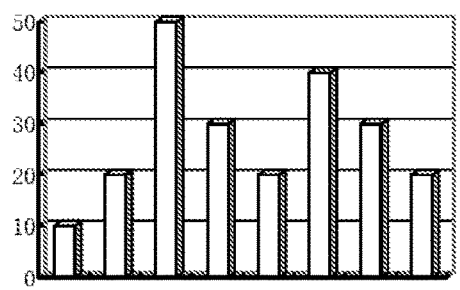
Figure 3D:
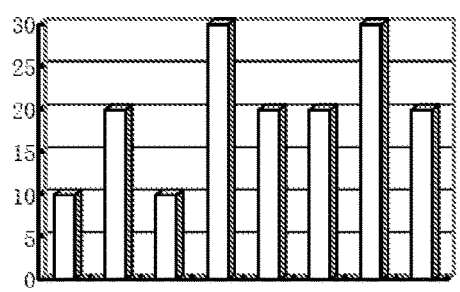

Similarly, FIGS. 3b-d respectively show eight-dimensional local feature vectors of grids 202-204 in FIG. 2 according to one embodiment of the present invention.

In step S3, in the block to be processed, according to a predetermined merging rule, at least two adjacent grids of the plurality of grids are merged into an intermediate block. The predetermined merging rule is to, for example, merge all the four adjacent grids forming a "田" shape in the block to be processed. As shown in FIG. 2, grids 201, 202, 203 and 204 are merged into an intermediate block, and grids 203, 204, 205 and 206 are merged into another intermediate block. Merging refers to cancelling the boundary between adjacent grids so that the grids become an intermediate block.

In step S4, according to the eight-dimensional local feature vectors of the grids contained in the intermediate block, an intermediate block merging feature vector of the intermediate block is calculated.

In a first implementation, a vector average value of the eight-dimensional local feature vectors of various grids contained in the intermediate block is taken as an intermediate block merging feature vector of the intermediate block. An intermediate block containing the grids 201, 202, 203 and 204 is taken as an example. The eight-dimensional local feature vectors of the grids 201, 202, 203 and 204 are respectively (10, 20, 30, 40, 20, 40, 30, 10), (20, 20, 20, 30, 20, 40, 30, 10), (10, 20, 50, 30, 20, 40, 30, 20) and (10, 20, 10, 30, 20, 20, 30, 20). Intermediate block merging feature vectors (12.5, 20, 27.5, 32.5, 20, 35, 30, 15) are obtained after a vector average value is taken, as shown in FIG. 4a.

In a second implementation, a maximum value of a specific dimension of the eight-dimensional local feature vectors of various grids contained in the intermediate block is taken as a corresponding dimension of an intermediate block merging feature vector of the intermediate block. For example, a maximum value is taken with regard to the first dimension of eight-dimensional local feature vectors (10, 20, 30, 40, 20, 40, 30, 10), (20, 20, 20, 30, 20, 40, 30, 10), (10, 20, 50, 30, 20, 40, 30, 20) and (10, 20, 10, 30, 20, 20, 30, 20) of grids 201, 202, 203 and 204 to obtain a first dimension 20 of an intermediate block merging feature vector; a maximum value is taken with regard to the second dimension of the vectors (10, 20, 30, 40, 20, 40, 30, 10), (20, 20, 20, 30, 20, 40, 30, 10), (10, 20, 50, 30, 20, 40, 30, 20) and (10, 20, 10, 30, 20, 20, 30, 20) to obtain a second dimension 20 of the intermediate block merging feature vector; . . . ; and finally, the obtained intermediate block merging feature vector is (20, 20, 50, 40, 20, 40, 30, 20), as shown in FIG. 4b.

In a third implementation, the eight-dimensional local feature vectors of various grids contained in the intermediate block are cascaded and then normalization is performed so as to obtain an intermediate block merging feature vector of the intermediate block. The normalization is obtained by way of calculating a norm of the cascaded n-dimensional local feature vectors of various grids and dividing each dimension of the cascaded n-dimensional local feature vectors of various grids by the norm. For example, the eight-dimensional local feature vectors (10, 20, 30, 40, 20, 40, 30, 10), (20, 20, 20, 30, 20, 40, 30, 10), (10, 20, 50, 30, 20, 40, 30, 20) and (10, 20, 10, 30, 20, 20, 30, 20) of grids 201, 202, 203 and 204 are cascaded to obtain a 32-dimensional vector (10, 20, 30, 40, 20, 40, 30, 10, 20, 20, 20, 30, 20, 40, 30, 10, 10, 20, 50, 30, 20, 40, 30, 20, 10, 20, 10, 30, 20, 20, 30, 20) and then a norm thereof is calculated as follows:

$$norm = \sqrt{\begin{aligned}&10^2 + 20^2 + 30^2 + 40^2 + 20^2 + 40^2 + 30^2 + 10^2 + 20^2 + 20^2 + 20^2 + \\ &30^2 + 20^2 + 40^2 + 30^2 + 10^2 + 10^2 + 20^2 + 50^2 + 30^2 + 20^2 + 40^2 + \\ &30^2 + 20^2 + 10^2 + 20^2 + 10^2 + 30^2 + 20^2 + 20^2 + 30^2 + 20^2\end{aligned}}.$$

Then, each dimension of the cascaded 32-dimensional vector (10, 20, 30, 40, 20, 40, 30, 10, 20, 20, 20, 30, 20, 40, 30, 10, 10, 20, 50, 30, 20, 40, 30, 20, 10, 20, 10, 30, 20, 20, 30, 20) is divided by the norm so as to obtain an intermediate block merging feature vector of an intermediate block composed of the grids 201, 202, 203 and 204, as shown in FIG. 4c.

In step S5, according to a predetermined combination rule, the intermediate block merging feature vectors obtained for different intermediate blocks of the block to be processed are combined into a general combination feature vector of the block to be processed. The meaning of combination is to calculate the intermediate block merging feature vectors obtained for different intermediate blocks of a block to be processed so as to obtain a general combination feature vector comprehensively reflecting each intermediate block merging feature vector.

The predetermined combination rule is to, for example, by taking the abovementioned steps of dividing a block to be processed into 16×16, 8×8, 8×4, 4×8, 4×4, 4×2, 2×4 and 2×2 grids respectively as an example, cascade the intermediate block merging feature vectors of all the intermediate blocks merged according to a predetermined merging rule after dividing the block to be processed into 16×16 grids, cascade the intermediate block merging feature vectors of all the intermediate blocks merged according to a predetermined merging rule after dividing the block to be processed into 8×8 grids, . . . , cascade the intermediate block merging feature vectors of all the intermediate blocks merged according to a predetermined merging rule after dividing the block to be processed into 2×2 grids, and finally cascade the cascaded intermediate block merging feature vectors obtained under the condition of dividing the block to be processed into 16×16 grids, the cascaded intermediate block merging feature vectors obtained under the condition of dividing the block to be processed into 8×8 grids, . . . and the cascaded intermediate block merging feature vectors obtained under the condition of dividing the block to be processed into 2×2 grids again so as to obtain a general combination feature vector of the block to be processed.

In step S6, by way of taking the general combination feature vector as a feature in a feature set of block processing, the block to be processed is processed.

Since with regard to each block to be processed, the abovementioned predetermined division rule, the predetermined merging rule, the approach of calculating an n-dimensional local feature vector of each grid, the approach of calculating an intermediate block merging feature vector of an intermediate block and the approach of combining the intermediate block merging feature vectors into a general combination feature vector are all consistent, this intermediate block merging feature vector can be taken as a feature to distinguish among different blocks to be processed.

A feature of a grid reflects a local feature of the grid, which belongs to a low grade feature. Information conveyed by the shape, etc. of the whole block to be processed belongs to a high grade feature. Furthermore, there is a middle grade feature between the low grade feature and the high grade feature, for example, information conveyed by the whole shape of several adjacent grids. The middle grade feature (e.g. an intermediate block merging feature vector) reflects a specific context relationship between grids, which is different from the low grade feature of the grid. By using this middle grade feature, the precision of processing a block to be processed can be greatly improved.

Other Variants

Although in the abovementioned embodiment, a block to be processed is divided into 16×16, 8×8, 8×4, 4×8, 4×4, 4×2, 2×4 and 2×2 grids respectively, actually, other numbers of grids can also be obtained after division. In addition, division may also not be performed for many times, and division is only performed once, e.g. dividing the block into 8×8 grids. In addition, equal-division may also not be performed on the length and width of a block to be processed, and thus the sizes of the grids after division in each division are not completely the same. In addition, it is also illustrative that each grid after division has 128×128 pixels, which can certainly have other numbers of pixels.

Although in the abovementioned embodiment, an eight-dimensional local feature vector is used to describe, actually, any dimension can be used. For example, when a four-dimensional local feature vector is used, a gradient direction of a pixel is approximated to 0 degrees, 90 degrees, 180 degrees and 270 degrees. The gradient direction between −45 degrees and 45 degrees may be approximated to 0 degrees; the gradient direction between 45 degrees and 135 degrees is approximated to 90 degrees; the gradient direction between 135 degrees and 225 degrees is approximated to 180 degrees; and the gradient direction between 225 degrees and 315 degrees is approximated to 270 degrees.

Although in the abovementioned embodiment, with regard to each grid in the plurality of grids, an n-dimensional local feature vector calculated by using a specific process is used (i.e. calculating a gradient value and a gradient direction of each pixel in the grid, wherein the gradient direction is approximated to one of n predetermined standard directions, and calculating a total gradient value of a pixel with a pixel gradient direction being approximated to a specific standard direction in the n standard directions in the grid as one dimension of an n-dimensional local feature vector of the grid), other processes can also be used. For example, the total gradient values of pixels with pixel gradient directions being approximated to various standard directions in the n standard directions in the grid are not counted, but the number of pixels with pixel gradient directions being approximated to various standard directions in the n standard directions in the grid is counted so as to obtain an n-dimensional local feature vector of the grid. In addition, the average brightness values of various pixels of a grid may also only be calculated as the local feature vectors of the grid, and n=1 at this moment.

Although in step S3 of the abovementioned embodiment, the predetermined merging rule is to merge all the four adjacent grids forming a "田" shape in the block to be processed, other predetermined merging rules may also be used. For example, each row in the block to be processed is merged or each column of the block to be processed is merged. As another example, a "田" shape is taken in an order of left-to-right and top-to-bottom from the top left corner of the block to be processed, and various "田" shapes must not be overlapped.

Although in step S4 of the abovementioned embodiment, three implementations are listed for calculating an intermediate block merging feature vector of the intermediate block, actually, other implementations may also be used. For example, a vector sum of the n-dimensional local feature vectors of various grids contained in the intermediate block is taken rather than a vector average value being taken as an intermediate block merging feature vector of the intermediate block. As another example, with regard to a specific dimension of an n-dimensional local feature vector, the quadratic sum of the value of the specific dimension of each grid contained in the intermediate block is calculated and then the square root is taken as a corresponding dimension of an intermediate block merging feature vector of the intermediate block.

Although in the abovementioned embodiment, the normalization is obtained by way of calculating a norm of the cascaded n-dimensional local feature vectors of various grids and dividing each dimension of the cascaded n-dimensional local feature vectors of various grids by the norm, and other normalization approaches known in the art can also be used.

In addition, after each dimension of the cascaded n-dimensional local feature vector of each grid is divided by the norm, if the value after a certain dimension is divided by the norm is greater than a certain threshold value (e.g. 0.2), it can be cut to be equal to the threshold value, and then a new norm at this moment is recalculated, and then each dimension is divided by the new norm again.

Although in the abovementioned embodiment, combining the intermediate block merging feature vectors obtained for different intermediate blocks of a block to be processed into a general combination feature vector of the block to be processed is achieved by simply cascading various intermediate block merging feature vectors, other predetermined combination rules can also be used. For example, a weighted cascading approach is used, and a weight used in weighing is pre-specified. Alternatively, various intermediate block merging feature vectors are cascaded and then normalized, etc. In addition, an approach of cascading various intermediate block merging feature vectors may not be used, but an approach of calculating statistical distribution vectors of various intermediate block merging feature vectors is used.

According to one embodiment of the present invention, an apparatus 5 for processing a block to be processed of a urine sediment image is further provided, which comprises a division unit 501, a first calculation unit 502, a merging unit 503, a second calculation unit 504, a combination unit 505 and a processing unit 506. The division unit 501 is configured to divide a block to be processed into a plurality of grids according to a predetermined division rule. The first calculation unit 502 is configured to calculate an n-dimensional local feature vector of each grid of the plurality of grids, where n is a positive integer. The merging unit 503 is configured to, in the block to be processed, according to a predetermined merging rule, merge at least two adjacent grids of the plurality of grids into an intermediate block. The second calculation unit 504 is configured to, according to the n-dimensional local feature vectors of the grids contained in the intermediate block, calculate an intermediate block merging feature vector of the intermediate block. The combination unit 505 is configured to, according to a predetermined combination rule, combine the intermediate block merging feature vectors obtained for different intermediate blocks of the block to be processed into a general combination feature vector of the block to be processed. The processing unit 506 is configured to, by way of taking the general combination feature vector as a feature in a feature set of block processing, process the block to be processed. The apparatus 5 can be realized using software, hardware (an integrated circuit, an FPGA, etc.) or a combination of software and hardware.

In addition, the apparatus 5 may be used for either of the following two: classifying the block to be processed; and performing block retrieval on the block to be processed.

In addition, the predetermined division rule may be to divide the block to be processed for many times, the sizes of the grids after division in each division being the same, and the sizes of the grids after division in different divisions being different.

In addition, the first calculation unit 502 may be configured to: calculate a gradient value and a gradient direction of each pixel in the grid, wherein the gradient direction is approximated to one of n predetermined standard directions; and calculate a total gradient value of a pixel with a pixel gradient direction being approximated to a specific standard direction in the n standard directions in the grid as one dimension of an n-dimensional local feature vector of the grid, with a total gradient value of a respective pixel in the n standard directions corresponding to n dimensions of the n-dimensional local feature vector.

In addition, the second calculation unit 504 may be configured to: take a vector average value of the n-dimensional local feature vectors of various grids contained in the intermediate block as an intermediate block merging feature vector of the intermediate block.

In addition, the second calculation unit 504 may be configured to: take a maximum value of a specific dimension of the n-dimensional local feature vectors of various grids contained in the intermediate block as a corresponding dimension of an intermediate block merging feature vector of the intermediate block.

In addition, the second calculation unit 504 may be configured to: cascade the n-dimensional local feature vectors of various grids contained in the intermediate block and perform normalization so as to obtain an intermediate block merging feature vector of the intermediate block.

In addition, the normalization may be obtained by way of calculating a norm of the cascaded n-dimensional local feature vectors of various grids and dividing each dimension of the cascaded n-dimensional local feature vectors of various grids by the norm.

In addition, the predetermined combination rule may be cascading intermediate block merging feature vectors obtained for different intermediate blocks of a block to be processed.

FIG. 6 shows a device 6 for processing a block to be processed of a urine sediment image according to one embodiment of the present invention. The device 6 may comprise a memory 601 and a processor 602. The memory 601 is used for storing an executable instruction. The processor 602 is used for performing an operation performed by each unit in the apparatus 5 according to the executable instruction stored in the memory.

In addition, one embodiment of the present invention further provides a machine-readable medium on which an executable instruction is stored, when the executable instruction is executed, a machine is caused to perform an operation performed by the processor 602.

Those skilled in the art should understand that various variations and modifications can be made to the above various embodiments without departing from the spirit of the present invention. Therefore, the scope of protection of the present invention should be defined by the appended claims.

The invention claimed is:

1. A computer-implemented method for processing a block to be processed of a urine sediment image by a processor executing executable instructions stored in a non-transitory memory, the method comprising:
   dividing the block to be processed of the urine sediment image into a plurality of grids according to a predetermined division rule;
   calculating an n-dimensional local feature vector of each grid of the plurality of grids, where n is a positive integer, wherein calculating the n-dimensional local feature vector of each grid of the plurality of grids comprises:
      calculating a gradient value and a gradient direction of each pixel in the grid, wherein the gradient direction is approximated to one of n predetermined standard directions; and
      calculating a total gradient value of a pixel with a pixel gradient direction being approximated to a specific standard direction in the n standard directions in the grid as one dimension of an n-dimensional local feature vector of the grid, with a total gradient value of a respective pixel in the n standard directions corresponding to n dimensions of the n-dimensional local feature vector;
   in the block of the urine sediment image to be processed, according to a predetermined merging rule, merging at least two adjacent grids of the plurality of grids into an intermediate block;
   according to the n-dimensional local feature vectors of the grids contained in the intermediate block, calculating an intermediate block merging feature vector of the intermediate block;
   according to a predetermined combination rule, combining the intermediate block merging feature vectors obtained for different intermediate blocks of the block to be processed into a general combination feature vector of the block to be processed; and
   using the general combination feature vector as a feature in a feature set of block processing to process the block of the urine sediment image to be processed.

2. The method as claimed in claim 1, characterized in that the predetermined division rule is to divide the block of the urine sediment image to be processed for many times, the sizes of the grids after division in each division being the same, and the sizes of the grids after division in different divisions being different.

3. The method as claimed in claim 1, characterized in that the step of calculating an intermediate block merging feature vector of the intermediate block comprises:
   taking a vector average value of the n-dimensional local feature vectors of various grids contained in the intermediate block as an intermediate block merging feature vector of the intermediate block.

4. The method as claimed in claim 1, characterized in that the step of calculating an intermediate block merging feature vector of the intermediate block comprises:
   taking a maximum value of a specific dimension of the n-dimensional local feature vectors of various grids contained in the intermediate block as a corresponding dimension of an intermediate block merging feature vector of the intermediate block.

5. The method as claimed in claim 1, characterized in that the step of calculating an intermediate block merging feature vector of the intermediate block comprises:
   cascading the n-dimensional local feature vectors of various grids contained in the intermediate block and performing normalization so as to obtain an intermediate block merging feature vector of the intermediate block.

6. The method as claimed in claim 5, characterized in that the normalization is obtained by way of calculating a norm of the cascaded n-dimensional local feature vectors of various grids and dividing each dimension of the cascaded n-dimensional local feature vectors of various grids by the norm.

7. The method as claimed in claim 1, characterized in that the predetermined combination rule is to cascade the intermediate block merging feature vectors obtained for different intermediate blocks of the block to be processed.

8. An apparatus for processing a block to be processed of a urine sediment image, comprising:
   a division unit configured to divide the block of the urine sediment image to be processed into a plurality of grids according to a predetermined division rule;
   a first calculation unit configured to calculate an n-dimensional local feature vector of each grid of the plurality of grids, where n is a positive integer, the first calculation unit being configured to:
      calculate a gradient value and a gradient direction of each pixel in the grid, wherein the gradient direction is approximated to one of n predetermined standard directions; and
      calculate a total gradient value of a pixel with a pixel gradient direction being approximated to a specific standard direction in the n standard directions in the grid as one dimension of an n-dimensional local feature vector of the grid, with a total gradient value of a respective pixel in the n standard directions corresponding to n dimensions of the n-dimensional local feature vector;
   a merging unit configured to, in the block to be processed, according to a predetermined merging rule, merge at least two adjacent grids of the plurality of grids into an intermediate block;
   a second calculation unit configured to, according to the n-dimensional local feature vectors of the grids contained in the intermediate block, calculate an intermediate block merging feature vector of the intermediate block;

a combination unit configured to, according to a predetermined combination rule, combine the intermediate block merging feature vectors obtained for different intermediate blocks of the block to be processed into a general combination feature vector of the block to be processed; and a processing unit configured to, by way of using the general combination feature vector as a feature in a feature set of block processing, process the block to be processed;

wherein the division unit, the first calculation unit, the merging unit, the second calculation unit, the combination unit and the processing unit include software, hardware, or a combination of software and hardware.

9. The apparatus as claimed in claim 8, characterized in that the predetermined division rule is to divide the block to be processed for many times, the sizes of the grids after division in each division being the same, and the sizes of the grids after division in different divisions being different.

10. The apparatus as claimed in claim 8, characterized in that the second calculation unit is configured to:

take a vector average value of the n-dimensional local feature vectors of various grids contained in the intermediate block as an intermediate block merging feature vector of the intermediate block.

11. The apparatus as claimed in claim 8, characterized in that the second calculation unit is configured to:

take a maximum value of a specific dimension of the n-dimensional local feature vectors of various grids contained in the intermediate block as a corresponding dimension of an intermediate block merging feature vector of the intermediate block.

12. The apparatus as claimed in claim 8, characterized in that the second calculation unit is configured to:

cascade the n-dimensional local feature vectors of various grids contained in the intermediate block and performing normalization so as to obtain an intermediate block merging feature vector of the intermediate block.

13. The apparatus as claimed in claim 12, characterized in that the normalization is obtained by way of calculating a norm of the cascaded n-dimensional local feature vectors of various grids and dividing each dimension of the cascaded n-dimensional local feature vectors of various grids by the norm.

14. The apparatus as claimed in claim 8, characterized in that the predetermined combination rule is to cascade the intermediate block merging feature vectors obtained for different intermediate blocks of a block to be processed.

15. A device for processing a block to be processed of a urine sediment image, comprising:

a memory for storing executable instructions, the executable instructions, when executed, implementing the method of claim 1; and a processor for executing the executable instructions.

16. A machine-readable medium on which an executable instruction is stored, when the executable instruction is executed, a machine is caused to perform the method of claim 1.

* * * * *